(12) United States Patent
Ioka

(10) Patent No.: US 6,814,448 B2
(45) Date of Patent: Nov. 9, 2004

(54) IMAGE PROJECTION AND DISPLAY DEVICE

(75) Inventor: Ken Ioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/964,179

(22) Filed: Sep. 26, 2001

(65) Prior Publication Data

US 2002/0041364 A1 Apr. 11, 2002

(30) Foreign Application Priority Data

Oct. 5, 2000 (JP) ........................................ 2000-306486

(51) Int. Cl.⁷ ........................ G03B 21/14; G03B 21/22; G03B 21/26; G03B 37/04; H04N 3/26
(52) U.S. Cl. ........................ 353/69; 353/71; 353/122; 353/94; 353/30; 348/745; 348/806; 352/70
(58) Field of Search ........................ 353/69, 71, 122, 353/94, 30; 348/745, 806; 352/69–71; 345/1.3

(56) References Cited

U.S. PATENT DOCUMENTS

| | | | | |
|---|---|---|---|---|
| 5,111,513 A | * | 5/1992 | Turner et al. | 382/100 |
| 5,136,390 A | * | 8/1992 | Inova et al. | 348/383 |
| 5,231,481 A | * | 7/1993 | Eouzan et al. | 348/658 |
| 5,825,947 A | * | 10/1998 | Sasaki et al. | 382/321 |
| 5,847,784 A | * | 12/1998 | Finnila et al. | 349/73 |
| 6,222,593 B1 | * | 4/2001 | Higurashi et al. | 348/745 |
| 6,412,956 B2 | * | 7/2002 | Fujita et al. | 353/122 |
| 6,456,339 B1 | * | 9/2002 | Surati et al. | 348/745 |
| 6,471,355 B1 | * | 10/2002 | Monson et al. | 353/30 |
| 6,480,175 B1 | * | 11/2002 | Schneider | 345/32 |
| 6,558,006 B2 | * | 5/2003 | Ioka | 353/94 |
| 6,590,621 B1 | * | 7/2003 | Creek et al. | 349/5 |

FOREIGN PATENT DOCUMENTS

JP          09-326981          12/1997

* cited by examiner

*Primary Examiner*—David Gray
*Assistant Examiner*—Magda Cruz
(74) *Attorney, Agent, or Firm*—Straub & Pokotylo; John C. Pokotylo

(57) ABSTRACT

Image projection and display devices include a plurality of projectors, a projection screen forming a focusing plane for the projected images from the plurality of projectors, mutually overlapping regions existing between the images, a test image storing section for storing prescribed test images, and an image capturing section for acquiring projected test images in which a prescribed test image is projected. The devices further include a correction data calculating section for calculating correction data for correcting the input images for the respective projectors, on the basis of the acquired test images, in such a manner that a uniform or continuous brightness is achieved across the whole projection area including the overlapping regions, a correction data storing section for storing the correction data thus calculated, and an image correcting section for correcting the images input to the respective projectors, by using the correction data.

6 Claims, 8 Drawing Sheets

IMAGE PROJECTION AND DISPLAY DEVICE

This application claims benefit of Japanese Application No. 2000-306486 filed in Japan on Oct. 5, 2000, the contents of which are incorporated by this reference.

BACKGROUND OF THE INVENTION

1. Field of the Invention

The present invention relates to an image projection and display device for obtaining seamless, fine, high-quality projected images using a plurality of projectors.

2. Description of the Related Art

In the prior art, there are known projection-type display devices wherein a cathode ray tube is used as a projection-type image display device which enlarges and projects an image onto a screen. Furthermore, in recent years, liquid crystal projection-type display devices using liquid crystal panels as light sources have been developed. In these liquid crystal projection-type display devices, a video signal is regenerated on a liquid crystal panel providing a two-dimensional display, light from a light source is modulated by the two-dimensional image reproduced on the aforementioned liquid crystal panel, and this light is enlarged and projected onto a screen by an optical system.

Meanwhile, in the prior art, there are also known multiscreen-type projection display devices which employ a plurality of liquid crystal projectors in order to achieve a large-screen projected image. In this system, a large screen is constituted by providing a vertical and horizontal array of a plurality of screens corresponding respectively to a plurality of projectors. However, in a multiscreen-type projection display device, each screen comprises a frame, and hence there is a problem in that the border regions between each screen are conspicuous.

Therefore, in recent years, an image projection system has been developed wherein respective projector images from a plurality of liquid crystal projectors are projected in arrayed fashion onto a single screen, thereby achieving a large-screen display. Such the image projection system is disclosed in Japanese Patent Application Laid-open No. H9-326981, which describes a method for achieving a large-screen display whereby, when projecting together images from a plurality of projectors onto a single screen, the adjoining portions of each projected image are made to overlap, in such a manner that the overlapping regions are not conspicuous, and a method for correcting geometrical distortion of the projected images due to the differences in the array positions of the respective projectors with respect to the screen.

However, the method disclosed in Japanese Patent Application Laid-open No. H9-326981 described above for calculating correction coefficients to ensure that the overlapping regions of the plurality of projected images are not conspicuous is a method which determines correction coefficients based on the assumption that the brightness level of an overlapping region can be derived by adding the respective image brightness levels for the relevant respective images which are projected individually onto the screen, and it corrects the respective projected images in the overlapping region by applying respective correction coefficients thereto. Therefore, in practice, it is not possible to ensure that uneven brightness and uneven color in the overlapping regions (joints) occurring between the images projected remain completely inconspicuous.

As described above, in an image projection system for achieving a large-screen display by projecting respective projector images for a plurality of liquid crystal projectors onto a single screen in an arrayed fashion, it has not always been possible to ensure that the overlapping regions of the plurality of projection images remain completely inconspicuous.

OBJECT AND SUMMARY OF THE INVENTION

One object of the present invention is to provide an image projection and display device whereby, when realizing a seamless large screen using a plurality of projectors, it is possible to make uneven brightness or uneven color in the overlapping regions even less conspicuous, and hence a more seamless, finer and higher quality projected image can be achieved.

In brief, an image projection and display device according to the present invention comprises the following:
- a plurality of projectors;
- a projection screen forming a focusing plane for projected images from the plurality of projectors, mutually overlapping regions existing between the images;
- a test image storing section for storing prescribed test images;
- an image capturing section for acquiring projected test images wherein a prescribed test image is projected onto the projection screen respectively by each of the projectors;
- a correction data calculating section for calculating correction data for correcting the input images for the respective projectors, on the basis of the acquired test images, in such a manner that a target brightness is achieved across the whole projection area including the overlapping regions;
- a correction data storing section for storing the correction data thus calculated; and
- an image correcting section for correcting the images input to the respective projectors, by using the correction data.

These objects and advantages of the present invention will become further apparent from the following detailed explantion.

DESCRIPTION OF THE PREFERRED EMBODIMENTS

Figure 1:
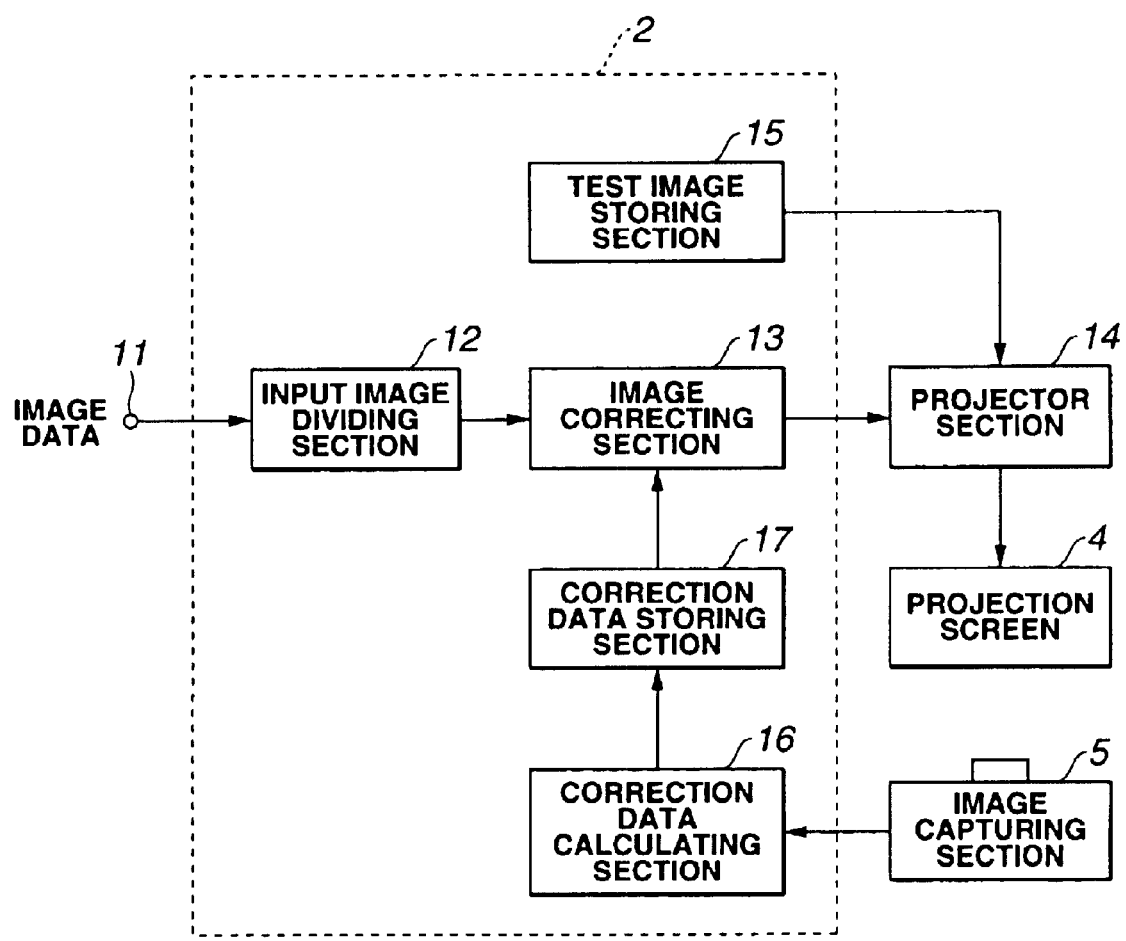
FIG. 1 is a block diagram of an image projection and display device relating to a first embodiment of the present invention.

Below, embodiments of the present invention are described referring to the drawings.

Figure 2:
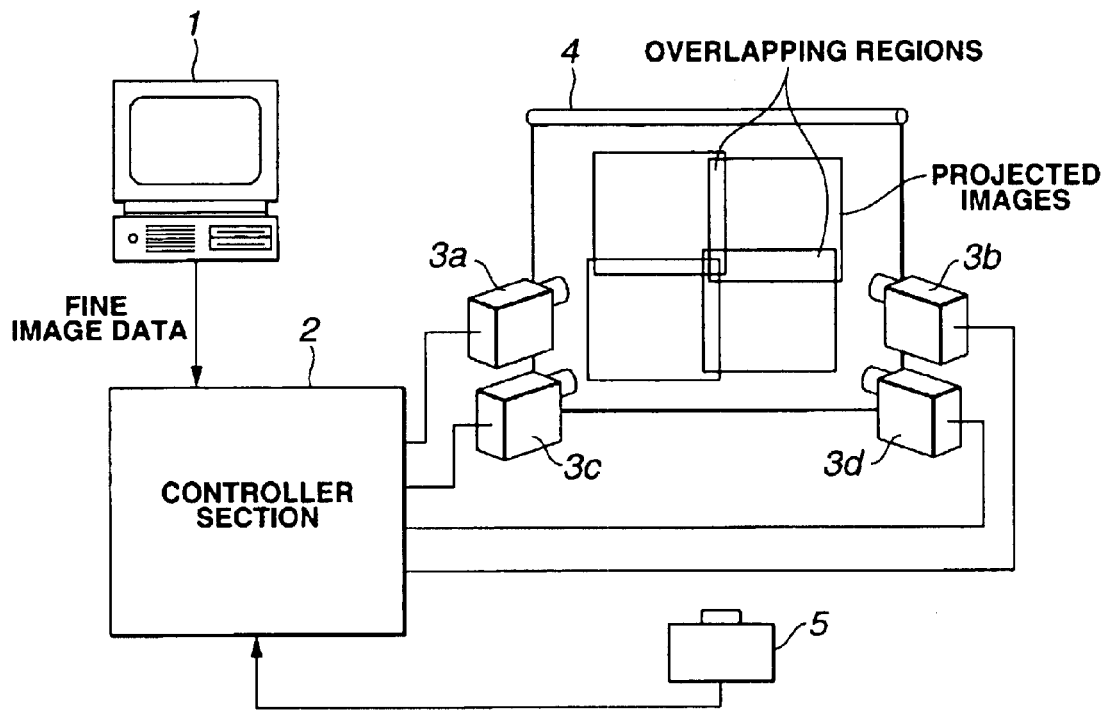
FIG. 2 is a diagram showing the general composition of an image projection system used in the image projection and display device relating to the first embodiment.

FIG. 1 is a block diagram showing an image projection and display device relating to a first embodiment of the present invention; and FIG. 2 is a diagram showing the general composition of the image projection system used in this image projection and display device relating to the first embodiment.

Firstly, the general composition of the image projection system will be described with reference to FIG. 2.

As illustrated in FIG. 2, this image projection system comprises, in general terms: a personal computer 1 forming an image generating section for generating fine image data; a controller section 2 for processing, dividing and outputting the fine image data from the personal computer 1 in accordance with a plurality of projectors used (in FIG. 2, four projectors), and also correcting the projected screen image on the basis of a captured image, with respect to each of the divided outputs, in such a manner that it achieves a target brightness across the whole projection area thereof including the superposed regions (overlapping regions); a plurality of projectors 3a–3d; and an image capture section 5, such as a digital camera, or the like, for capturing a test image, or the like, projected on a screen 4. For the aforementioned projectors 3a–3d, a liquid-crystal projector or DLP device (abbreviation for Digital Light Processing, a digital projection technique based on a DMD (Digital Micromirror Device), which is an optical semiconductor).

In a composition of this kind, the fine image data created and output by the personal computer 1 is output to the controller section 2. The controller section 2 determines which portion of the fine image data is to be output to which of the respective projectors and it performs correction processing with respect to each projector image, by using correction data, in such a manner that a target image brightness is achieved across the whole projection area, including the overlapping regions. To obtain the required correction data, a test image is previously projected from the projectors onto the screen 4, that projected image is captured by means of an image information gathering camera 5, and the correction data is created on the basis of the captured image data. The method for calculating the correction data is described below.

FIG. 1 is a block diagram showing the composition of an image projection and display device relating to a first embodiment of the present invention, wherein parts which are the same as FIG. 2 are similarly labelled.

The image projection and display device illustrated in FIG. 1 comprises, for example: an input terminal 11 to which fine image data is input from a personal computer; a projector section 14 comprising a plurality of projectors (3a–3d); an input image dividing section 12 for dividing the input image in accordance with the respective projectors; an image correcting section 13 for correcting the images input to each respective projector by using the aforementioned correction data; a projection screen 4 forming a focusing plane for the projection images from the plurality of projectors, which have mutual overlapping regions; a test image storing section 15 for storing prescribed test images; an image capturing section 5 for acquiring a projected image wherein the prescribed test image is projected onto the projection screen 4 by the respective projectors; a correction data calculating section 16 for calculating correction data for correcting the input images to each of the aforementioned projectors, on the basis of the acquired test image, in such a manner that a target brightness is achieved in the whole projection area including the overlapping regions; and a correction data storing section 17 for storing the correction data thus calculated.

In a composition of this kind, the fine image data input to the input terminal 11 is divided in accordance with the respective projectors by the input image dividing section 12. The image correcting section 13 then corrects the divided image data for each projector using the correction data, in such a manner that a target brightness is achieved over the whole projection area, including the overlapping regions.

In the image projection and display device described here, it is supposed that the color differentials and gamma characteristics have previously been corrected between the respective projectors, whereupon the brightness of the projected images is corrected by the image correcting section 13 in such a manner that a target brightness is achieved over the whole projection area, including the overlapping regions.

The corrected image data for each projector is converted to an analog signal by a D/A converting section (not illustrated), and then supplied to the respective projector (3a–3d) of the projector section 14. The respective projector images are then projected onto the screen 4 by the respective projectors (3a–3d). The test image storing section 15 stores a test image which is a monotone image of a neutral grey or white tone, that is projected from the respective projectors. The aforementioned correction data is determined by projecting the test image read out from the aforementioned test image storing section 15 onto the screen 4, capturing the projected test image by means of an image capturing section 5, such as a digital camera, or the like, and then calculating correction values, in the correction data calculating section 16, for correcting the input images to each projector so as to achieve a target brightness in the whole projection area including the overlapping regions, on the basis of the captured image data. The calculated correction data is stored in the correction data storing section 17. A method for calculating the correction data in the correction data calculating section 16 is described hereinafter.

Figure 3A:
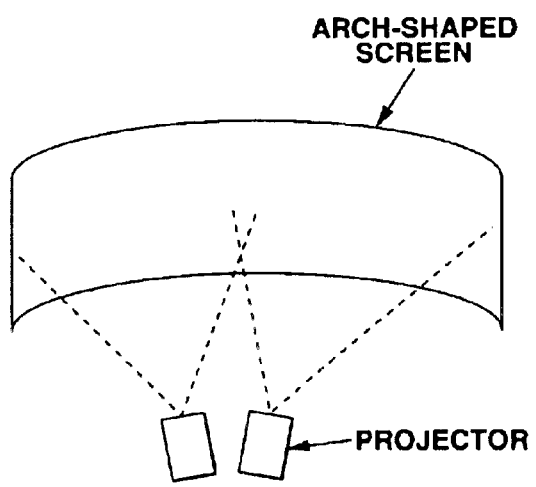
FIG. 3A is a diagram showing a further example of the curved form of a projection screen in the image projection and display device according to the first embodiment.
Figure 3B:
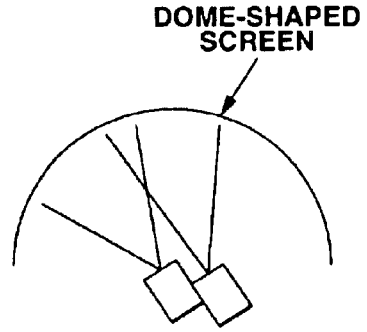
FIG. 3B is a diagram showing yet a further example of the curved form of a projection screen in the image projection and display device according to the first embodiment.

The aforementioned projection screen 4 may be a flat screen as shown in FIG. 2, or it may also be a cylindrical shaped (called an arch shape) as illustrated in FIG. 3A or a spherical shaped (called a dome shape) as illustrated in FIG. 3B.

The aforementioned test image storing section 15 stores a grey or white test screen for correcting the brightness of the whole projection area of the screen. However, provided that the respective R, G, B color differentials and gamma characteristics of the respective projectors have already been corrected, then a color, such as R, G, or B may also be used as a test image. However, since it is considered that there will always remain some degree of difference between the R, G, B color characteristics of the projectors, it is desirable that grey or white light which contains all three colors, R, G, B, is used for correction. When using a light shield to perform approximate correction of the brightness of the overlapping regions, it is also necessary to store a test image comprising a black image for correcting the bias of the images produced by the projectors (even when a black input signal of level 0 is input, the projected images do not turn completely black, and their residual brightness (or "offset" amount) in this case is termed the "bias").

There are two methods for calculating correction data for correcting the input images to each projector in such a manner that a target brightness is achieved in the whole projection area including the aforementioned overlapping regions, namely (1) a method whereby correction data is calculated so that a uniform brightness is achieved in the whole projection region including the overlapping regions, and (2) a method whereby correction data is calculated so that a continuous brightness is achieved in the whole projection area including the aforementioned overlapping regions.

Whichever of these correction data calculating methods is used, in the overlapping regions between the plurality of projected images, at least two projected images are mutually superimposed, and therefore it is assumed that the brightness thereof will be two or more times greater. The brightness increase is brought about in the overlapping region. Even when black images are produced respectively by two projectors (in other words, a black image signal of level 0 is input to each projector), there will be a two-fold brightness increase in the display in the overlapping region therebetween, based on the offset amounts of the respective projectors described above.

Therefore, conventionally, in order to correct brightness increase in the overlapping regions on the basis of the offset when projecting a black image, a portion of the projected light in the overlapping region is excluded by a light shield. This is because, since the offset during black projection occurs despite the fact that the input signal has zero level, it is impossible to correct this offset by further lowering the level of the actual input signal. Therefore, the offset is corrected by adopting a method whereby the projected light is physically shielded, and hence a light shield for excluding a portion of the light is inserted into the path of the projected light passing through the projection lens.

The foregoing is now described with reference to FIG. 4A–FIG. 4D and FIG. 5.

Figure 4A:
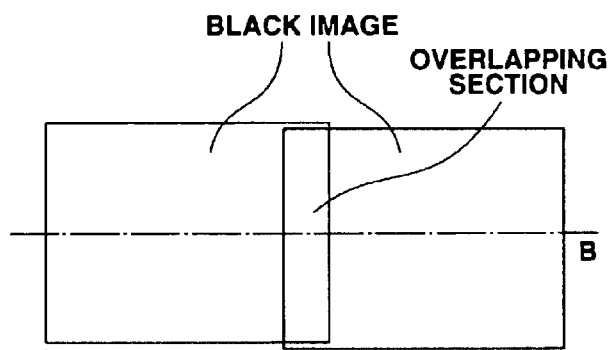
FIG. 4A is a diagram illustrating a state in which black images are projected on the screen from two projectors in image projection and display device according to the first embodiment.
Figure 4B:
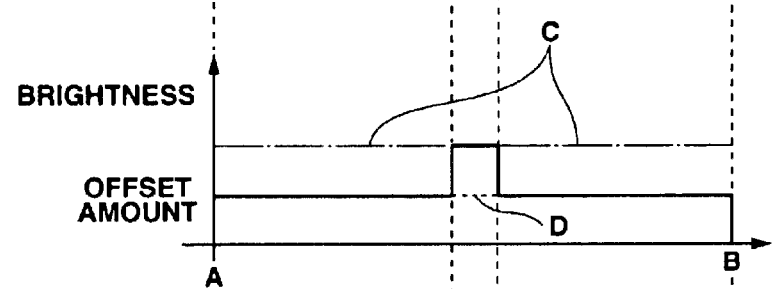
FIG. 4B is a diagram showing distribution of brightness of FIG. 4A when there is no light shields in the image projection and display device according to the first embodiment.

As shown in FIG. 2, in an overlapping region generated when the images from a plurality of projectors are projected in superimposed fashion onto a screen 4, if the signal levels input to two projectors 3a, 3b are both set to their minimum level, in other words, a black level, for example, then these black images will mutually overlap on the screen, as illustrated in FIG. 4A, and the brightness of the corresponding overlapping region will be twice the brightness of the projector offset, based on the offset amounts of the respective projectors 3a, 3b, as indicated by the solid line in FIG. 4B. However, in seeking to lower the brightness of this overlapping region, it is not possible to perform correction by reducing the input image signals to the respective projectors since these input signal levels cannot be reduced further.

However, there are two conceivable methods for correcting the brightness of the overlapping regions based on the offset for each projector. In the first such method, since the input signal in the overlapping region cannot be reduced to zero, conversely, the brightness of the regions other than the overlapping region is raised to a brightness equal to that of the overlapping region (indicated by the double-dotted line C in FIG. 4B), thereby achieving a uniform brightness across the whole projection area of the plurality of projectors.

In order to correct the bias of the whole projection area of a plurality of projectors by using this first method, a black level image as described above is projected onto the screen 4 by a single projector (during which the projectors other than the projector being measured are switched off or are completely shielded using lens caps), the projected image is captured by a camera forming the image capturing section 5, and the captured image data is stored in a memory in the correction data calculating section 16.

Next, the aforementioned black level image is projected onto the screen 4 from another projector (during which the projectors other than the projector being measured are switched off or are completely shielded using lens caps), the projected image is captured by the camera forming the image capturing section 5, and the captured image data is stored in a memory in the correction data calculating section 16. The correction data calculating section 16 then calculates the brightness of the overlapping region by adding the projection data for the two projectors. According to the brightness for the overlapping region thus calculated, correction data is created for setting the brightness level of the regions of the projected images from each projector other than the overlapping region to the same brightness level as that of the overlapping region, and by using the correction data thus obtained to correct the input signals, it is possible to make the brightness of the regions other than the overlapping region equal to that of the overlapping region.

Figure 5:
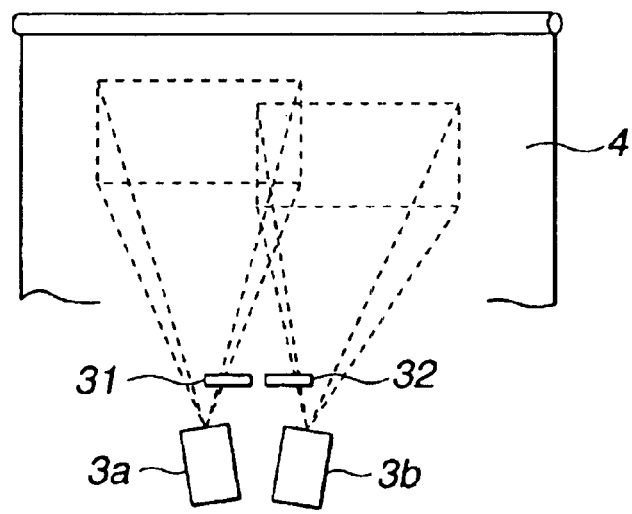
FIG. 5 is a diagram for describing a method for correcting the offset amount for an overlapping region by means of light shields in the image projection and display device according to the first embodiment.

However, although this method resolves irregularities in brightness due to the offset, it does not eliminate the offset, and hence a true black image cannot be obtained, even when the input image is black. A second method involves physically shielding the light corresponding to the overlapping regions of images projected by a plurality of projectors. Specifically, as shown in FIG. 5, light shields 31, 32 are provided in the light paths of projected light passing through the projection lenses of respective projectors 3a, 3b, to correct the offset during black projection (to achieve uniform characteristics) by reducing the amount of light in the overlapping regions (indicated by dotted line D in FIG. 4B).

Figure 4C:
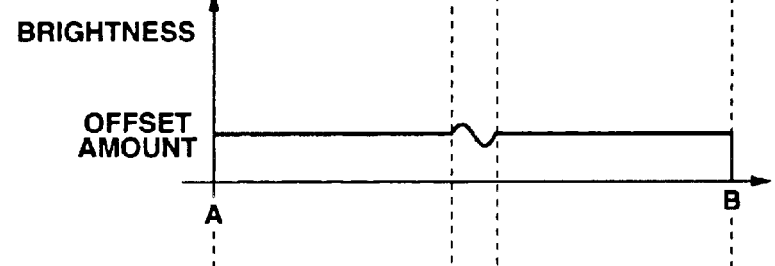
FIG. 4C is a diagram showing an example of distribution of brightness of FIG. 4A when there exist light shields in the image projection and display device according to the first embodiment.
Figure 4D:
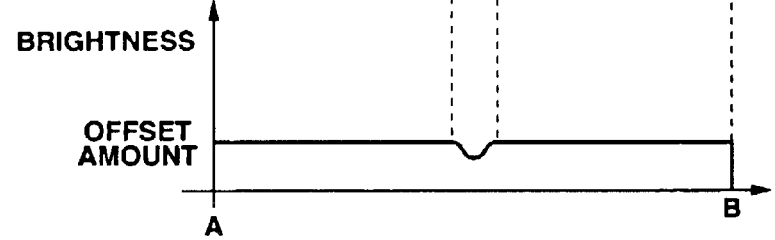
FIG. 4D is a diagram showing another example of distribution of brightness of FIG. 4A when there exist light shields in the image projection and display device according to the first embodiment.

In this second method which corrects offset by using light shields, the brightness should be corrected to achieve uniform characteristics, as indicated by the dotted line D in FIG. 4B, but in actual practice, either the overlapping regions assume a non-uniform brightness comprising fluctuations, as illustrated in FIG. 4C, or alternatively, the light shields 31, 32 penetrate too deeply into the respective light paths and cause the brightness of the overlapping regions to fall, conversely, below the brightness of the regions other than the overlapping regions, as illustrated in FIG. 4D.

Therefore, although it is possible to correct the brightness of the overlapping regions using light shields, the correction achieved is not perfect, as indicated in FIG. 4C or FIG. 4D. That is, it is difficult to perform the perfect correction, because the light shields must be adjusted a lot of times to achieve uniform brightness as illustrated by the dotted line D in FIG. 4B. Consequently, in order to correct the brightness of the whole projection area including the overlapping regions by projecting a test image from the respective projectors, the overlapping regions are set to approximately uniform characteristics by using light shields, and in addition to this, correction data for the brightness irregularities existing in the whole of the screen area (including brightness irregularities arising due to insufficient correction in the overlapping regions) is obtained with all the projectors in a projecting state.

In other words, a target value for the brightness across the whole screen area is set, and correction for achieving that target value is applied, while the image actually projected onto the whole screen is captured, and hence it is possible to equalize any form of brightness irregularity across the whole screen area.

Firstly, a method for calculating correction data to achieve uniform brightness across the whole projection area including the overlapping regions is described with reference to FIG. 6.

Figure 6:
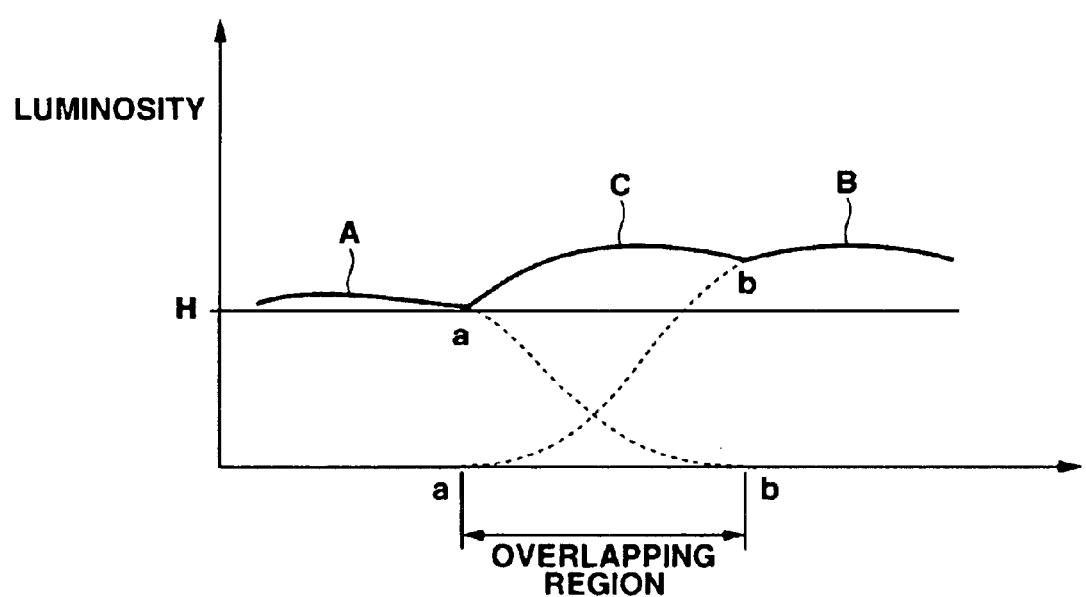
FIG. 6 is a diagram showing a first example of a brightness correction method for the whole projection area in the image projection and display device according to the first embodiment.

FIG. 6 shows one example of a correction data calculating method used in the image projection and display device according to the present embodiment.

In order to simplify the explanation, a composition is described wherein physical offset correction is applied to an overlapping region by providing light shields 31, 32 in the light path of projected light passing through the projection lenses (not illustrated) of two projectors 3a, 3b, as shown in FIG. 5.

In FIG. 6, the horizontal axis indicates the projection region on the screen 4, and the vertical axis indicates brightness (luminosity). Curve A is the luminosity change of projector 3a and curve B is the luminosity change of projector 3b. The respective luminosities of curves A, B indicate the reduction in the quantity of light in the overlapping region due to the effects of the light shields. Curve C indicates the measured brightness of the overlapping region. Furthermore, curve (e.g., line) H indicates a target brightness value, for achieving uniform brightness in the projection area. This target value H is, for example, an average value of the brightness calculated by the correction data calculating section 16 on the basis of image data for the whole projection area as acquired by the image information acquiring camera 5.

The correction data calculating section 16 determines the differences between the target value H of luminosity and the measured luminosity levels A, C, B, including the overlapping region, and it performs correction for the whole projection area by either using these luminosity differentials directly as correction data, or deriving correction data by determining correction coefficients for cancelling out these differentials. Thereby, it is possible to achieve the same luminosity in the overlapping region and the other regions of the screen, and hence the overlapping region at the borders between the two projection images become inconspicuous.

Next, a method for calculating correction data to achieve continuous brightness in the whole projection area including the overlapping regions is described with reference to FIG. 7.

Figure 7:
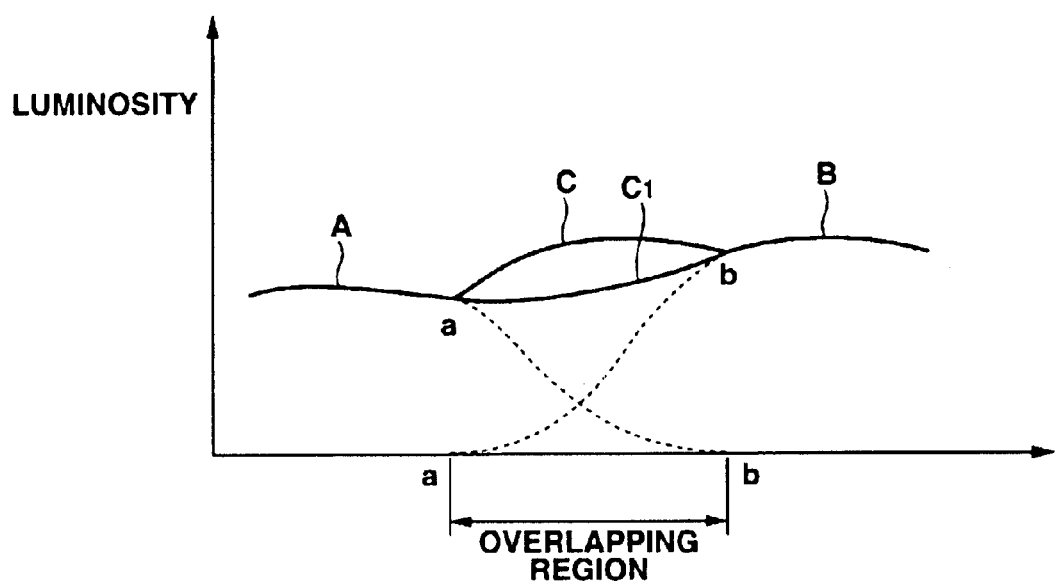
FIG. 7 is a diagram showing a second example of the brightness correction method for the whole projection area in the image projection and display device according to the first embodiment.

FIG. 7 shows a second example of a correction data calculating method used in a image projection and display device according to the present embodiment.

In FIG. 7, the horizontal axis indicates the projection region on the screen 4, and the vertical axis indicates brightness (luminosity). Curve A is the luminosity change of projector 3a and curve B is the luminosity change of projector 3b. The respective luminosities of curves A, B indicate the reduction in the quantity of light in the overlapping region due to the effects of the light shields. Curve C indicates the measured brightness of the overlapping region. Then curve C1 indicates the target luminosity change for the luminosity change C in the overlapping region to link smoothly with the luminosity changes A, B in the two regions other than the overlapping region, and it corresponds to a suitable curve linking the borders a, b of the overlapping region.

The correction data calculating section 16 determines the target luminosity change C1 in the overlapping region for smoothly linking the luminosity changes A, B, by referring to these luminosity changes A, B, calculates the differential between the measured luminosity level C and the target luminosity curve C1, and performs correction for the overlapping region, by either using this luminosity differential directly as correction data, or by deriving correction data by determining a correction coefficient for cancelling out the differential. Thereby, the luminosity change is made to transform smoothly between the overlapping region and the other regions, and hence the overlapping region at the boundary between the two projected images is prevented from becoming conspicuous.

Figure 8:
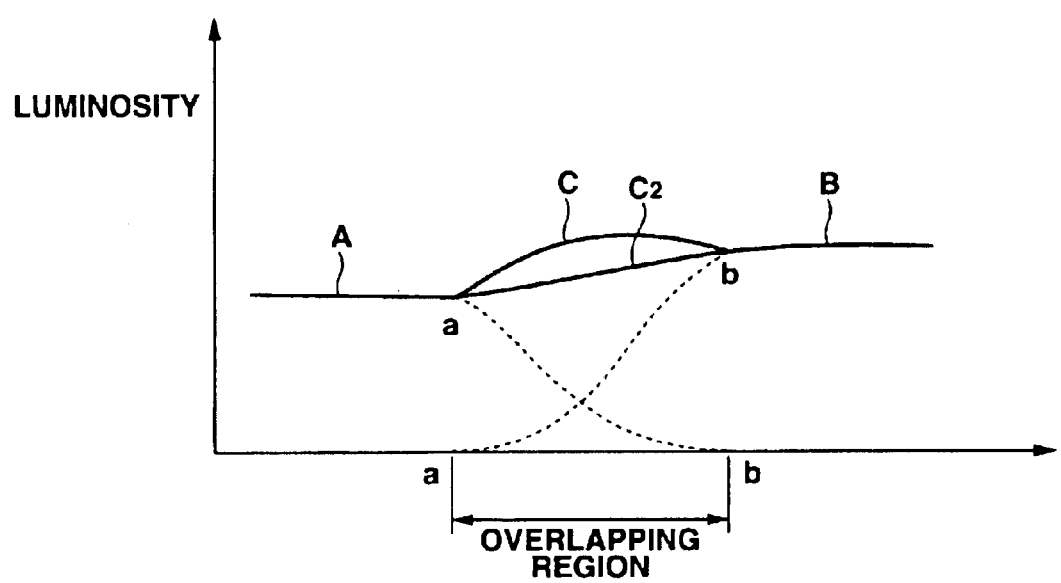
FIG. 8 is a diagram showing a third example of the brightness correction method for the whole projection area in the image projection and display device according to the first embodiment.

FIG. 8 illustrates a third example of a correction data creating method used in the image projection and display device according to the present embodiment.

In FIG. 8, the horizontal axis indicates the projection region on the screen 4, and the vertical axis indicates brightness (luminosity). Curve A is the luminosity change of projector 3a and curve B is the luminosity change of projector 3b. The respective luminosities of curves A, B indicate the reduction in the quantity of light in the overlapping region due to the effects of the light shields. Curve C indicates the measured brightness of the overlapping region. Then straight line C2 indicates target luminosity change for linking the luminosity change C in the overlapping region smoothly with the luminosity changes A, B in the two regions other than the overlapping region, and it corresponds to a straight line linking the borders a, b of the overlapping region.

The correction data calculating section 16 determines the target linear luminosity change C2 in the overlapping region for smoothly linking the luminosity changes A, B, by referring to these luminosity changes A, B, calculates the differential between the measured luminosity level C and the target luminosity curve C2, and performs correction for the overlapping region, by either using this luminosity differential directly as correction data, or by deriving correction data by determining a correction coefficient for cancelling out the differential. Thereby, the luminosity change is made to transform smoothly between the overlapping region and the other regions, and hence the overlapping region at the boundary between the two projected images is prevented from becoming conspicuous.

Figure 9:
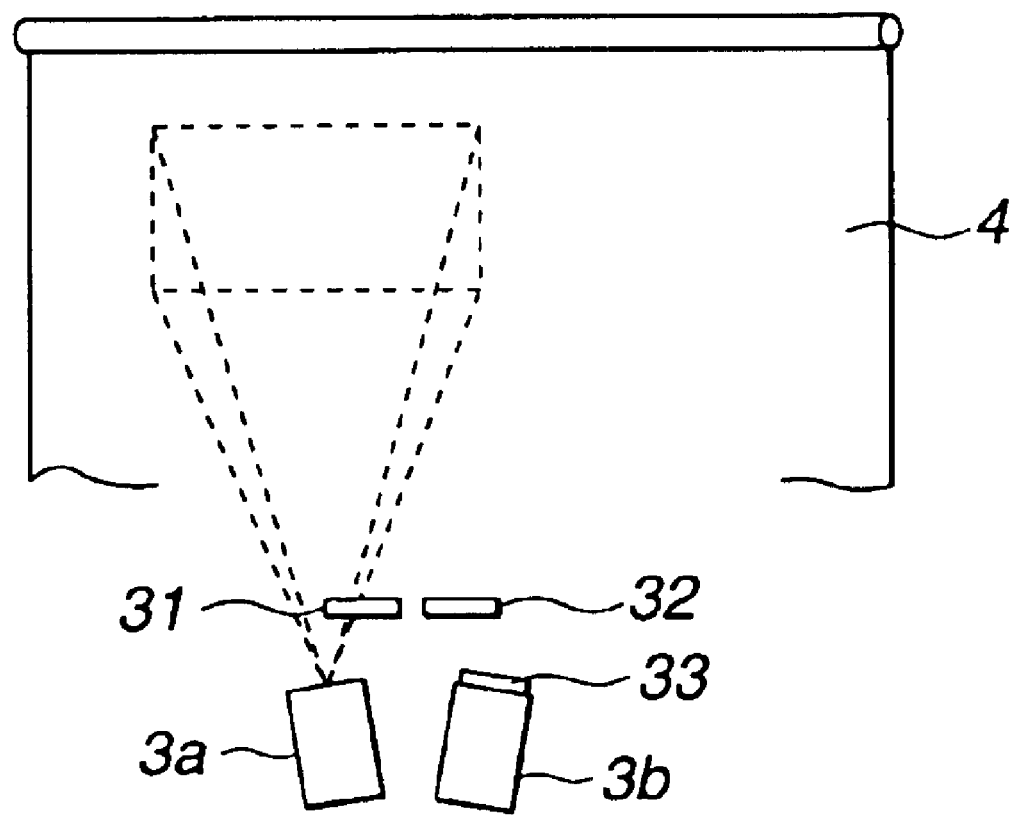
FIG. 9 is a diagram for describing a projection method for each projector when conventional correction data is obtained.

Further, FIG. 9 is a diagram for describing a projection method for respective projectors when obtaining conventional correction data. In a conventional technique for calculating correction coefficients to ensure that the overlapping regions between a plurality of projected images do not become conspicuous, in order to determine correction coefficients based on the assumption that the brightness level of an overlapping region can be derived by adding the respective image brightness levels for the relevant respective images when projected individually onto the screen, it is necessary to measure the brightness level of the images by projecting the respective images from respective projectors 3a, 3b separately onto the screen, during which the projectors other than the projector being measured must be shielded completely by placing a lens cap 33 thereon, and hence the work involved becomes complex.

Figure 10:
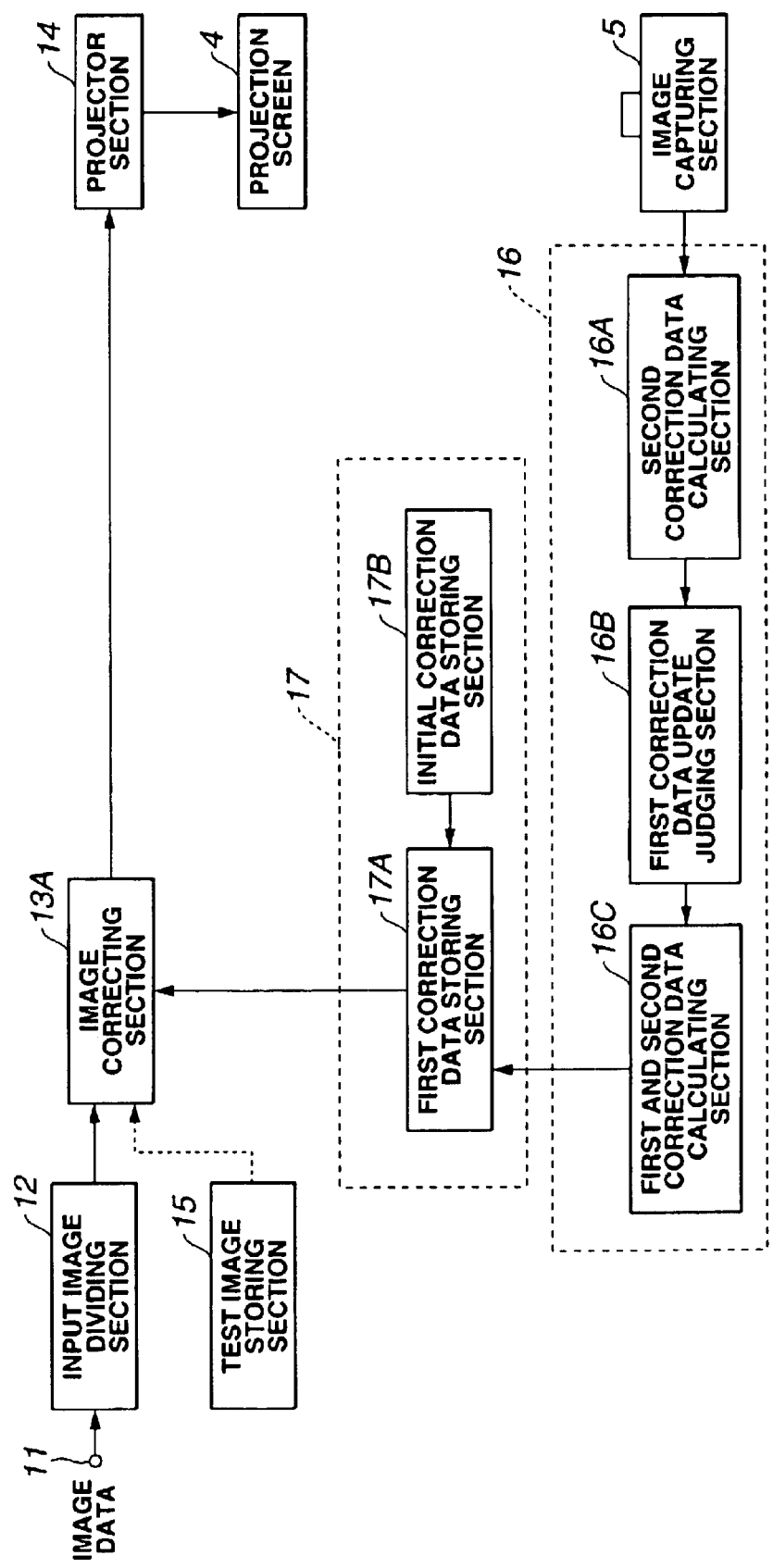
FIG. 10 is a block diagram showing an image projection and display device relating to a second embodiment of the present invention.

FIG. 10 shows a block diagram of an image projection and display device forming a second embodiment of the present invention. Parts which are the same as FIG. 1 are similarly labelled.

The image projection and display device according to the second embodiment as illustrated in FIG. 10 comprises, for example, an input terminal 11 to which fine image data is input from a personal computer; a projector section 14 comprising a plurality of projectors (3a–3d); an input image dividing section 12 for dividing the input image in accordance with the respective projectors; an image correcting section 13A for correcting the images input to respective projector by using the aforementioned correction data; a projection screen 4 forming a focusing plane for the projection images from the plurality of projectors, which have mutual overlapping regions; a test image storing section 15 for storing prescribed test images; an image capturing section 5 for acquiring a projected image wherein the prescribed test image is projected onto the projection screen 4 by the respective projectors; a correction data calculating section 16 for calculating correction data for correcting the input images to each of the aforementioned projectors, on the basis of the acquired test image, in such a manner that a target brightness is achieved in the whole projection area including the overlapping regions; and a correction data storing section 17 for storing the correction data thus calculated.

This second embodiment (see FIG. 10) differs from the first embodiment (see FIG. 1) in the following respects.

In the first embodiment described above, a composition is adopted whereby, in order to project a fine image from an image generating section comprising a personal computer, or the like, input images for each projector are entered to the image correcting section 13A from the input image dividing section 12, which corrects the input images for each projector thus entered by using correction data from the correction data storing section 17 and supplies this corrected data to the respective projectors, but in the second embodiment, in addition to the foregoing, when correcting the brightness across the whole projection area of the projection screen 4, test images are input from the test image storing section 15 to the image correcting section 13A, which corrects the test images for each projector thus input by using correction data from the correction data storing section 17, and then supplies this corrected data to the respective projectors.

Also in this second embodiment, the correction data storing section 17 comprises the first correction data storing section 17A and an initial correction data storing section 17B for storing correction data in an initial state (correction data when no correction has been performed, for example, correction data having a correction coefficient of "1").

Moreover, in this second embodiment, the correction data calculating section 16 comprises a second correction data calculating section 16A, a first correction data update judging section 16B and a first and second correction data calculating section 16C.

Figure 11:
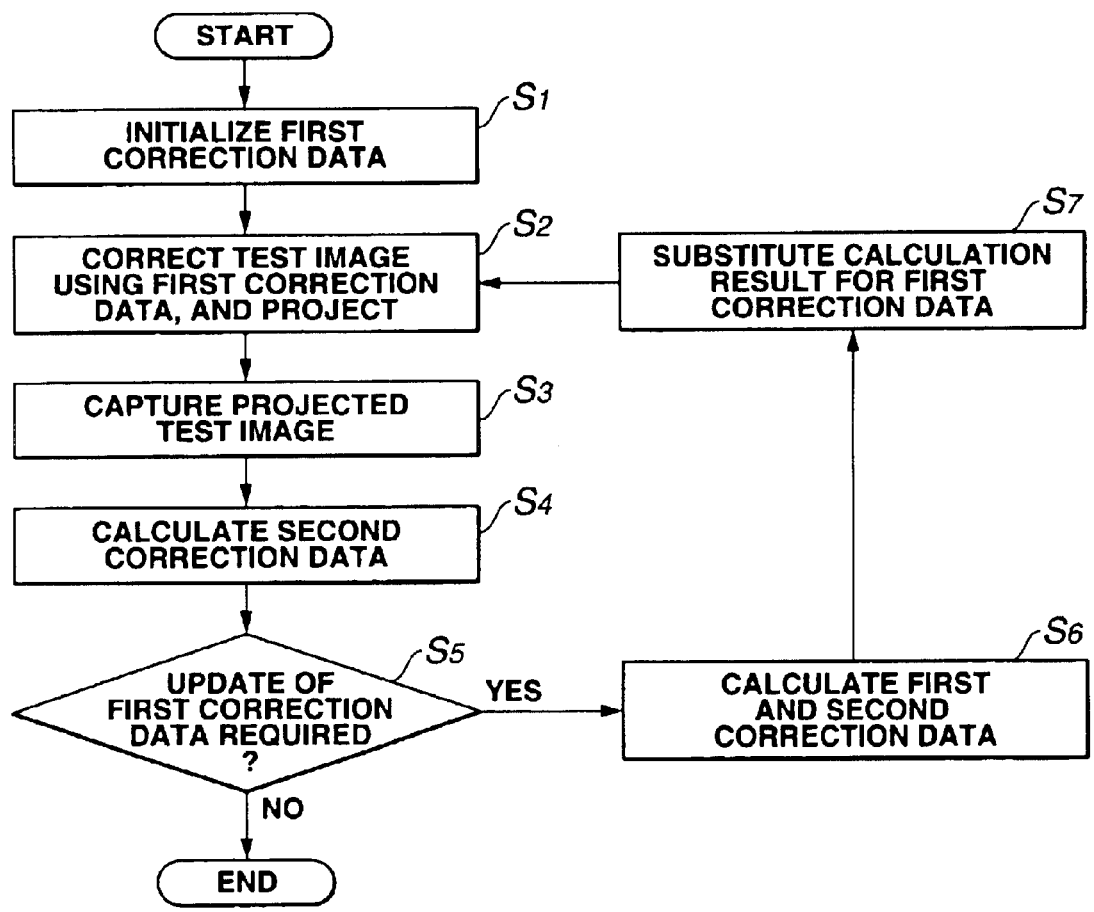
FIG. 11 is a flowchart for describing a correction data creating operation in the image projection and display device relating to the second embodiment.

In the composition according to this second embodiment, since the method for calculating the correction data by projecting test images diverges from the method employed in the first embodiment, it is explained here with reference to the flowchart in FIG. 11, centered on the operation for creating correction data.

Firstly, at step S1, the first correction data in the correction data storing section 17 is initialized using the initial correction data. Thereupon, at step S2, a prescribed test image is corrected by the image correcting section 13A using the first correction data, and projected from the respective projectors onto the screen 4. Then the projected test image is captured by the image capturing section 5 (step S3). At step S4, the correction data calculating section 16 calculates the second correction data from the image captured by the image capturing section 5, and the sequence then proceeds to step S5.

At step S5, it is determined from the calculated second correction data whether or not the first correction data needs to be updated. If it is judged that updating is necessary at S5, then the second correction data and the first correction data are, for example, multiplied together (step S6). Thereupon, at step S7, the calculation result is stored as new first correction data in the correction data storing section 17. The sequence then returns to step S2, where the test image is corrected again using the first correction data and then projected. The calculation in step S6 is not limited to multiplication.

Subsequently, the operations in steps S2–S7 are repeated and the operation of updating the first correction data is repeated, until it is judged at S5, from the second correction data, that it is not necessary to create new first correction data.

In the correction data creating operation according to the first embodiment, a test image is projected only once from each projector, in order to create correction data to achieve a target brightness across the whole projection area from the test images as acquired by the image capturing section. By contrast, in the correction data creating operation according to the second embodiment, after carrying out the correction data creating operation according to the first embodiment once, and correcting the test image according to the correction data thus obtained, a feedback correction procedure is implemented whereby the corrected test image is projected again, it is judged whether or not the brightness of the test image captured by the image capturing section 5 comes within a target brightness threshold range (in other words, range of tolerance) across the whole projection area, and if it does not come within this range, the initial first correction data is replaced by more accurate correction data.

As described above, by means of the image projection and display device according to the respective embodiments, in realizing a seamless large screen using a plurality of projectors, it is possible to make the interfaces between the overlapping region and non-overlapping regions, as well as the overlapping regions themselves even less conspicuous, and hence a more seamless, finer and higher quality projected image can be achieved.

In this invention, it is apparent that a wide range of different working modes can be formed on the basis of this invention without departing from the spirit and scope of the invention. This invention is not restricted by any specific embodiment.

What is claimed is:

1. An image projection and display device comprising:
   a plurality of projectors;
   a projection screen forming a focusing plane for projected images from the plurality of projectors, mutually overlapping regions existing between said images;
   a test image storing section for storing prescribed test images;
   an image capturing section for acquiring projected test images in which a prescribed test image is projected onto said projection screen respectively by each of said projectors;
   a correction data calculating section for calculating correction data for correcting the input images for the respective projectors, on the basis of the acquired test images, in such a manner that a target brightness is achieved across the whole projection area including the overlapping regions;
   a correction data storing section for storing the correction data thus calculated; and
   an image correcting section for correcting the images input to the respective projectors, by using said correction data,
   wherein at least one of the prescribed test images stored in the test image storing section is a white test screen.

2. An image projection and display device comprising:
   a plurality of projectors;
   a projection screen forming a focusing plane for projected images from the plurality of projectors, mutually overlapping regions existing between said images;
   a test image storing section for storing prescribed test images;
   an image capturing section for acquiring projected test images in which a prescribed test image is projected onto said projection screen respectively by each of said projectors;
   a correction data calculating section for calculating correction data for correcting the input images for the respective projectors, on the basis of the acquired test images, in such a manner that a target brightness is achieved across the whole projection area including the overlapping regions;
   a correction data storing section for storing the correction data thus calculated; and
   an image correcting section for correcting the images input to the respective projectors, by using said correction data,
   wherein at least one of the prescribed test images stored in the test image storing section is a gray test screen.

3. An image projection and display device comprising:
   a plurality of projectors;
   a projection screen forming a focusing plane for projected images from the plurality of projectors, mutually overlapping regions existing between said images;
   a test image storing section for storing prescribed test images;
   an image capturing section for acquiring projected test images in which a prescribed test image is projected onto said projection screen respectively by each of said projectors;
   a correction data calculating section for calculating correction data for correcting the input images for the respective projectors, on the basis of the acquired test images, in such a manner that a target brightness is achieved across the whole projection area including the overlapping regions;
   a correction data storing section for storing the correction data thus calculated; and
   an image correcting section for correcting the images input to the respective projectors, by using said correction data,
   wherein at least one of the prescribed test images stored in the test image storing section is one of a red, green and blue color test screen.

4. For use in an image projection and display device including a plurality of projectors and a projection screen forming a focusing plane for projected images from the plurality of projectors with mutually overlapping regions existing between the images, apparatus comprising:
   a test image storing section for storing prescribed test images;
   an image capturing section for acquiring projected test images in which a prescribed test image is projected onto said projection screen respectively by each of said projectors;
   a correction data calculating section for calculating correction data for correcting the input images for the respective projectors, on the basis of the acquired test images, in such a manner that a continuous brightness is achieved across the whole projection area including the overlapping regions;
   a correction data storing section for storing the correction data thus calculated; and
   an image correcting section for correcting the images input to the respective projectors, by using said correction data,
   wherein at least one of the prescribed test images stored in the test image storing section is a white test screen.

5. For use in an image projection and display device including a plurality of projectors and a projection screen forming a focusing plane for projected images from the plurality of projectors with mutually overlapping regions existing between the images, apparatus comprising:
   a test image storing section for storing prescribed test images;
   an image capturing section for acquiring projected test images in which a prescribed test image is projected onto said projection screen respectively by each of said projectors;
   a correction data calculating section for calculating correction data for correcting the input images for the respective projectors, on the basis of the acquired test images, in such a manner that a continuous brightness is achieved across the whole projection area including the overlapping regions;
   a correction data storing section for storing the correction data thus calculated; and
   an image correcting section for correcting the images input to the respective projectors, by using said correction data,
   wherein at least one of the prescribed test images stored in the test image storing section is a gray test screen.

6. For use in an image projection and display device including a plurality of projectors and a projection screen forming a focusing plane for projected images from the plurality of projectors with mutually overlapping regions existing between the images, apparatus comprising:

a test image storing section for storing prescribed test images;

an image capturing section for acquiring projected test images in which a prescribed test image is projected onto said projection screen respectively by each of said projectors;

a correction data calculating section for calculating correction data for correcting the input images for the respective projectors, on the basis of the acquired test images, in such a manner that a continuous brightness is achieved across the whole projection area including the overlapping regions;

a correction data storing section for storing the correction data thus calculated; and an image correcting section for correcting the images input to the respective projectors, by using said correction data, wherein at least one of the prescribed test images stored in the test image storing section is one of a red, green and blue color test screen.

* * * * *